(12) United States Patent
Hack (10) Patent No.: US 7,412,091 B2
(45) Date of Patent: Aug. 12, 2008

(54) SYSTEM AND METHOD FOR REGISTRATION OF CUBIC FISHEYE HEMISPHERICAL IMAGES

(75) Inventor: Jeff Hack, London (CA)

(73) Assignee: iLOOKAbout Inc., Ontario (CA)

( * ) Notice: Subject to any disclaimer, the term of this patent is extended or adjusted under 35 U.S.C. 154(b) by 930 days.

(21) Appl. No.: 10/433,906

(22) PCT Filed: Dec. 7, 2001

(86) PCT No.: PCT/CA01/01755

§ 371 (c)(1),
(2), (4) Date: Oct. 15, 2003

(87) PCT Pub. No.: WO02/47028

PCT Pub. Date: Jun. 13, 2002

(65) Prior Publication Data
US 2004/0061933 A1    Apr. 1, 2004

Related U.S. Application Data

(60) Provisional application No. 60/279,662, filed on Mar. 30, 2001.

(30) Foreign Application Priority Data

Dec. 7, 2000    (CA) .................................... 2327843

(51) Int. Cl.
*G06K 9/00* (2006.01)
*G06K 9/40* (2006.01)
(52) U.S. Cl. .................. 382/154; 382/162; 382/167; 382/254; 382/260; 382/261; 382/265; 382/266; 382/269
(58) Field of Classification Search ................. 382/154, 382/162, 167, 254, 260, 261, 265, 266, 269
See application file for complete search history.

(56) References Cited

U.S. PATENT DOCUMENTS 4,152,724 A    5/1979    Hunter (Continued)

FOREIGN PATENT DOCUMENTS

EP    0 119 09    6/1984

(Continued)

OTHER PUBLICATIONS

Greene, N., "Environment Mapping and Other Applications of World Projections," *IEEE Computer Graphics and Applications*, (Nov. 1, 1986), vol. 6, No. 11, pp. 21-29, IEEE Inc., New York, U.S., XP000002234, ISSN: 0272-1716.

(Continued)

*Primary Examiner*—Bhavesh Mehta
*Assistant Examiner*—Jonathan C Schaffer
(74) *Attorney, Agent, or Firm*—Foley & Lardner LLP (57) ABSTRACT

Systems and methods for registering hemispheric images obtained using a fisheye lens for panoramic viewing, relating to spatial alignment and colour balancing of complement half-side images derived from the hemispheric images. The systems and methods for spatial alignment determine the displacement of the digitized recorded images using a single translation and rotation model of distortion, which further evaluates the centre of projection, and the extent of translation and rotation. The system and method for colour balancing iteratively increase (or decrease) the values of pixels near the edge (discontinuity) between the two half-sides of an image, each time taking into consideration the average difference of pixel colour across a smaller strip of the edge near the pixel. This invention removes the colour differential but does not remove any detail underlying the features of the image.

40 Claims, 4 Drawing Sheets

U.S. PATENT DOCUMENTS

| | | | |
|---|---|---|---|
| 4,463,380 | A | 7/1984 | Hooks, Jr. |
| 4,549,208 | A | 10/1985 | Kamejima et al. |
| 4,736,436 | A | 4/1988 | Yasukawa et al. |
| 4,772,942 | A | 9/1988 | Tuck |
| 4,807,158 | A | 2/1989 | Blanton et al. |
| 4,858,149 | A | 8/1989 | Quarendon |
| 4,899,293 | A | 2/1990 | Dawson et al. |
| 4,965,844 | A | 10/1990 | Oka et al. |
| 5,023,725 | A | 6/1991 | McCutchen |
| 5,067,019 | A | 11/1991 | Juday et al. |
| 5,068,735 | A | 11/1991 | Tuchiya et al. |
| 5,130,794 | A | 7/1992 | Ritchey |
| 5,175,808 | A | 12/1992 | Sayre |
| 5,200,818 | A | 4/1993 | Neta et al. |
| 5,396,583 | A | 3/1995 | Chen et al. |
| 5,446,833 | A | 8/1995 | Miller et al. |
| 5,561,756 | A | 10/1996 | Miller et al. |
| 5,990,941 | A | 11/1999 | Jackson et al. |
| 6,031,540 | A | 2/2000 | Gilbert et al. |
| 6,128,108 | A | 10/2000 | Teo |
| 6,754,400 | B2 * | 6/2004 | Florin et al. ............ 382/285 |

FOREIGN PATENT DOCUMENTS

| | | |
|---|---|---|
| EP | 0 810 776 A | 12/1997 |
| JP | 02 127877 | 5/1990 |
| WO | WO 82/03712 | 10/1982 |
| WO | WO 96/26610 | 8/1996 |

OTHER PUBLICATIONS

A. Paeth, "Digital Cartography for Computer Graphics", Graphics Gems, 1990, pp. 307-320.

Communications Of The acm, "Interactive Technologies", Association for Computing Machinery, vol. 32, No. 7, Jul. 1989.

F. Kenton Musgrave, "A Panoramic Virtual Screen for Ray Tracing", Graphics Gems, 1992, pp. 288-294.

F. Pearson II, "Map Projections Theory and Applications", CRC Press, Inc., 1990, pp. 215-345.

G. David Ripley, "DVI—A Digital Multimedia Technology", Communications of the ACM Jul. 1989 vol. 32, No. 7, pp. 811-822.

G. Wolberg, "Digital Image Warping", IEEE Computer Society Press, 1988.

Heckbert, "Fundamentals of Texture Mapping and Image Warping", Report No. UCB/CSD 89/516, Jun. 1989.

J. Blinn et al., Texture and Reflection in Computer Generated Images, Comm. ACM, vol. 19, No. 10, 1976, pp. 542-547.

J.D. Foley et al., "Computer Graphics: Principles and Practice", 1990, 1996, pp. 229-381.

M. Onoe et al., "Digital Processing of Images Taken by Fish-Eye Lens", IEEE: Proceedings, New York, 1982, vol. 1, pp. 105-108.

N. Greene et al., "Creating Raster Omnimax Images from Multiple perspective Views Using the Elliptical Weighted Average Filter", IEEE Computer Graphics and Applications, Jun. 1986, pp. 21-27.

N. Greene, "A Method of Modeling Sky for Computer Animations", Proc. First Int'l. Conf. Engineering and Computer Graphics, Aug. 1984, pp. 297-300.

N. Greene, "Environment Mapping and Other Applications of World Projections", IEEE Computer Graphics and Applications, Nov. 1986, pp. 21-29.

R. Kingslake, "Optical System Design", Academic Press, 1983, pp. 86-87.

S. Morris, "Digital Video Interactive—A New Integrated Format for Multi-Media Information", Microcomputer for Information Management, Dec. 1987, 4(4):249-261.

S. Ray, "The Lens in Action", Hastings House, 1976, pp. 114-117.

Science & Technology, Mar. 6, 1995, pp. 54-55, NASA's Tiny Camera Has A Wide-Angle Future, Larry Armstrong and Larry Holyoke.

* cited by examiner

SYSTEM AND METHOD FOR REGISTRATION OF CUBIC FISHEYE HEMISPHERICAL IMAGES

This application claims the benefit of U.S. provisional application Ser. No. 60/279,662, filed Mar. 30, 2001.

FIELD OF THE INVENTION

This invention relates to systems and methods for registering hemispheric images for panoramic viewing. In particular it relates to spatial alignment and colour balancing of images.

BACKGROUND AND GENERAL DESCRIPTION

Fisheye lens has experienced success in a number of applications involving panoramic or wide field-of-view applications. Such would include cinematography (U.S. Pat. No. 4,070,098), motionless surveillance (U.S. Pat. No. RE036207), and image-based virtual reality (U.S. Pat. No. 5,960,108).

The advantage of fisheye projection is its large field of view compared to conventional rectilinear film. Images of field of view up to 220 degrees and beyond may be obtained with a fisheye lens. It has been speculated that a field of view infinitesimally less than 360 degrees is also obtainable, although the precise practical application of a lens of this type may be limited. In contrast, a conventional camera would require a rectilinear image recording surface of infinite dimensions for even 180 degrees of field of view.

As long ago as 1964, formal studies have been made of the optical characteristics of the fisheye lens (Kenro Miyamoto, "Fish eye lens", *Journal of Optical Society of America*, 54:1060-1061, 1964). In 1983, Ned Greene suggested the use of fisheye images to generate environmental maps (Ned Greene, "A Method for Modeling Sky for Computer Animation", *Proc. First Int'l Conf. Engineering and Computer Graphics*, pp.297-300, 1984). During the same year, Max Nelson described the use of In 1986, the use of perspective mapping for a fisheye image, projecting the latter into the sides of a rectangular box as an environmental map was introduced by Greene (Ned Greene, "Environmental Mapping and Other Applications of World Projections", *IEEE Computer Graphics and Applications*, November 1986, vol. 6, no. 11, pp. 21-29). Greene took a 180 degree fisheye image (a fisheye environmental map) and projected it onto the six sides of a cube for perspective viewing.

Producing high-quality panoramic imaging using Greene's approach poses a number of difficulties. Each hemispheric image produces four half-sides of a cube, in addition to a full side, which require registration with its complement from the other hemispheric image. Registration of the half-images has two associated problems: spatial alignment and colour balancing.

Where the lens has a field of view greater than 180 degrees, the corresponding half-sides (as de-warped from the raw source image) require spatial alignment due to possible rotational and translational distortion. Furthermore, the image recording device would not necessarily capture the images precisely in the same area on the recording surface. Conventional methods of aligning the sides of such images are essentially manual in nature; even if assisted by graphics software, the process requires human intervention to line up the edges of half-sides based on the features in the images. This is often imprecise and difficult due to the multiple sources of distortion. There is a need for a more automatic process which reduces human intervention.

Chromatically, each half-side must be aligned relative to its complement. For example, the recording device may have the same exposure times and aperture openings for each of the two images despite the fact that the amount of light recorded for each image differs, as where the lighting changed between the two capture events, or alternatively, where the exposure times are different for each image despite equivalent lighting conditions. If aperture size is controlled automatically, further mismatches may result. As a result the complementary edges of half-images have different colour intensity but generally the same detail and level of noise.

Existing methodology for colour balancing tend to average the colour values of pixels in the relevant neighbourhood of the transition. This has the desired effect of bringing the difference across the transition into line. However, the disadvantage concerns the concomitant loss of detail. As a result there is a perceptible blurring across the region of the transition. When the width of the overlapped region is narrow as compared to lighting imbalance, the transition may appear too abrupt.

SUMMARY OF THE INVENTION

This invention provides systems and methods for registering hemispheric images obtained using a fisheye lens for panoramic viewing. In particular it relates to spatial alignment and colour balancing of complement half-side images derived from the hemispheric images.

The system and method for spatial alignment determines the displacement of the digitized recorded images using a single translation and rotation model of distortion, which further evaluates the centre of projection, the distance in pixel for 180 degree in the recorded image, the extent of translation and rotation.

The system and method for colour balancing iteratively increase (or decrease) the values of pixels near the edge (discontinuity) between the two half-sides of an image, each time taking into consideration the average difference of pixel colour across the edge of a strip of decreasing width. This invention removes the colour differential but does not remove any detail underlying the features of the image.

BRIEF DESCRIPTION OF THE DRAWINGS

Embodiments of the invention will be described by way of example and with reference to the drawings in which.

DETAILED DESCRIPTION OF THE INVENTION

Figure 1:
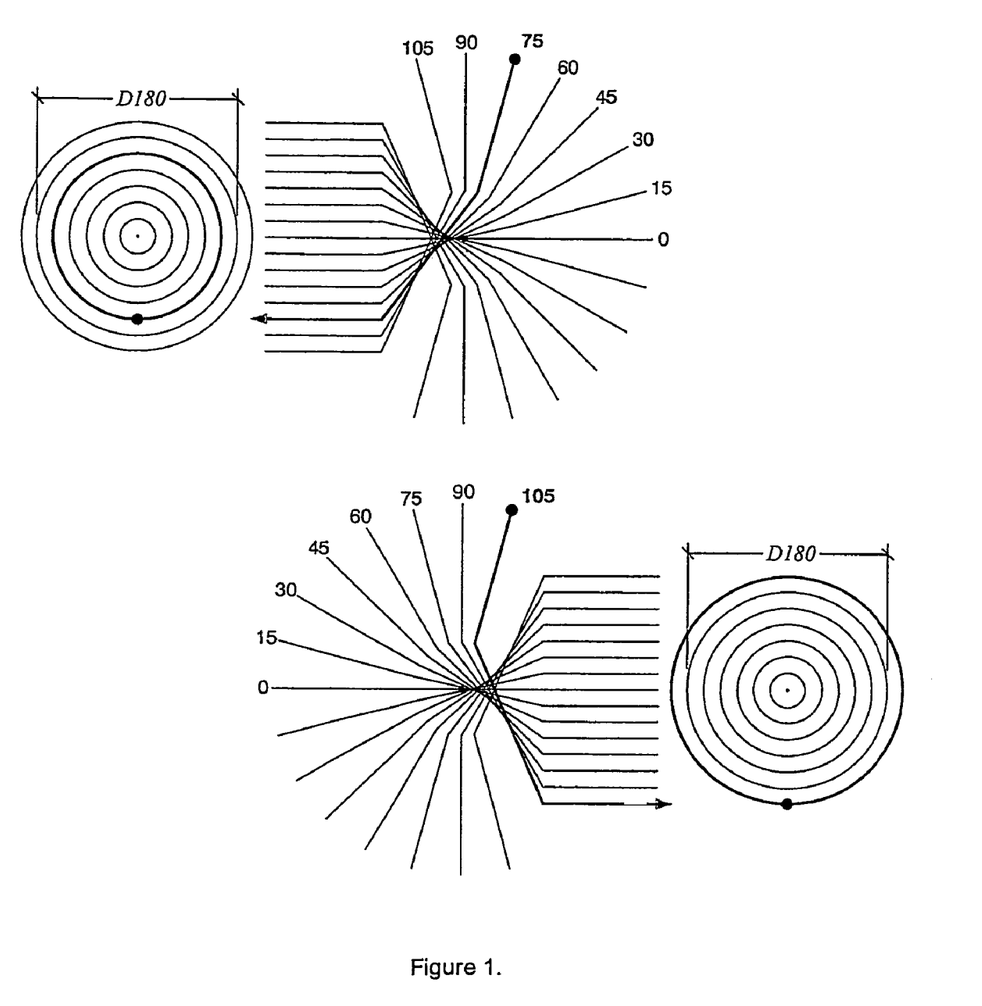
FIG. 1: A diagram showing the relationship between the angle subtended by a point and the radial position on the recorded source image.

The description given below assumes the use of an ideal fisheye lens, meaning that the lens possesses negligible if no radial distortion: the radial position recorded in the source image for a point imaged is proportional to the zenith angle the point subtends with respect to the axis of projection (see FIG. 1). However, a person knowledgeable in the art would be able to extend the invention disclosed below to the case where there is radial distortion. Adjustment to take into consideration lens characteristics are clear once the characteristics are determined.

Furthermore, the fisheye lens has a field of view greater than 180 degrees.

Overview

Figure 2:
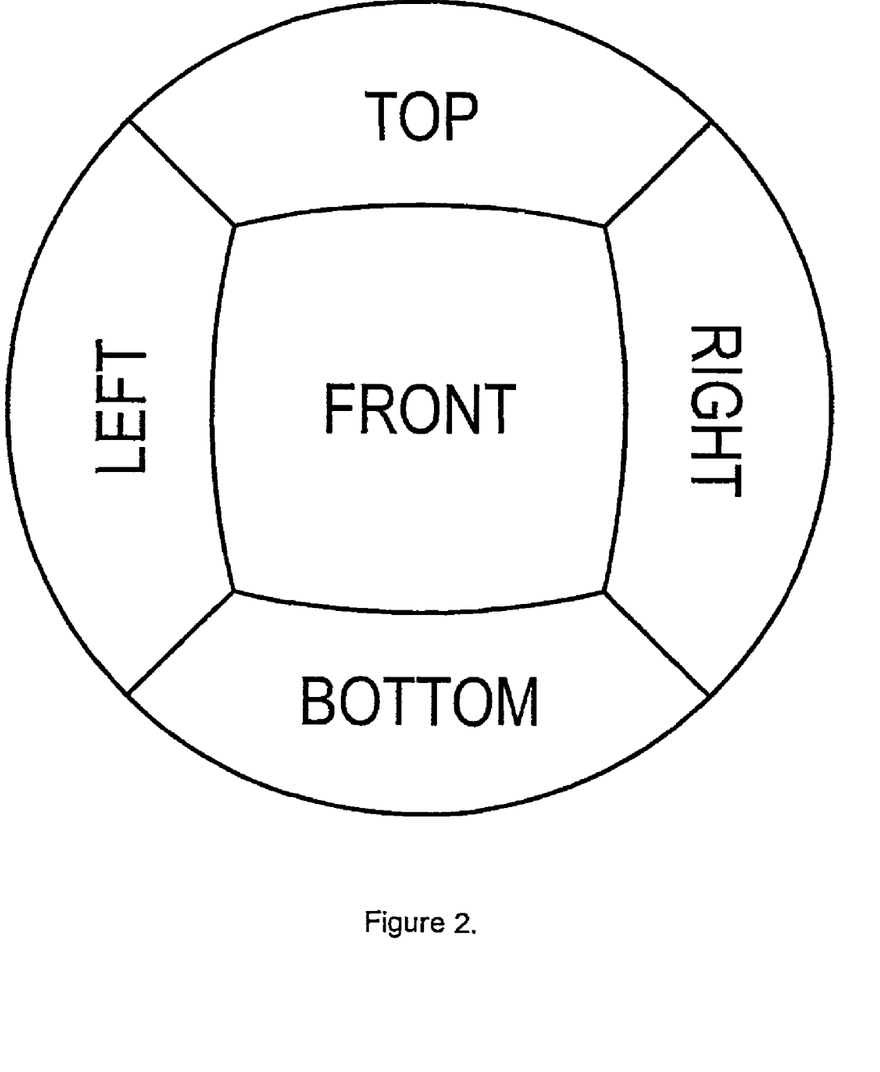
FIG. 2: A diagram showing the mapping from the hemispheric image to 5 sides of the cube.

In the present invention, an environmental map of cube consisting of 6 canonical views is reconstructed from two hemispherical fisheye images, as Greene had suggested, each with field of view equal or greater than 180 degrees. Each fisheye image is manipulated to generate 1 complete side and 4 half-sides of a cube; and the half sides are then integrated to form 4 complete sides; all six sides as the environmental map are then placed together for viewing as a complete cube texture map using computer graphic techniques. See FIG. 2 for an overall depiction of how a hemispherical image may be decomposed into the various sides of a cube.

Figure 3:
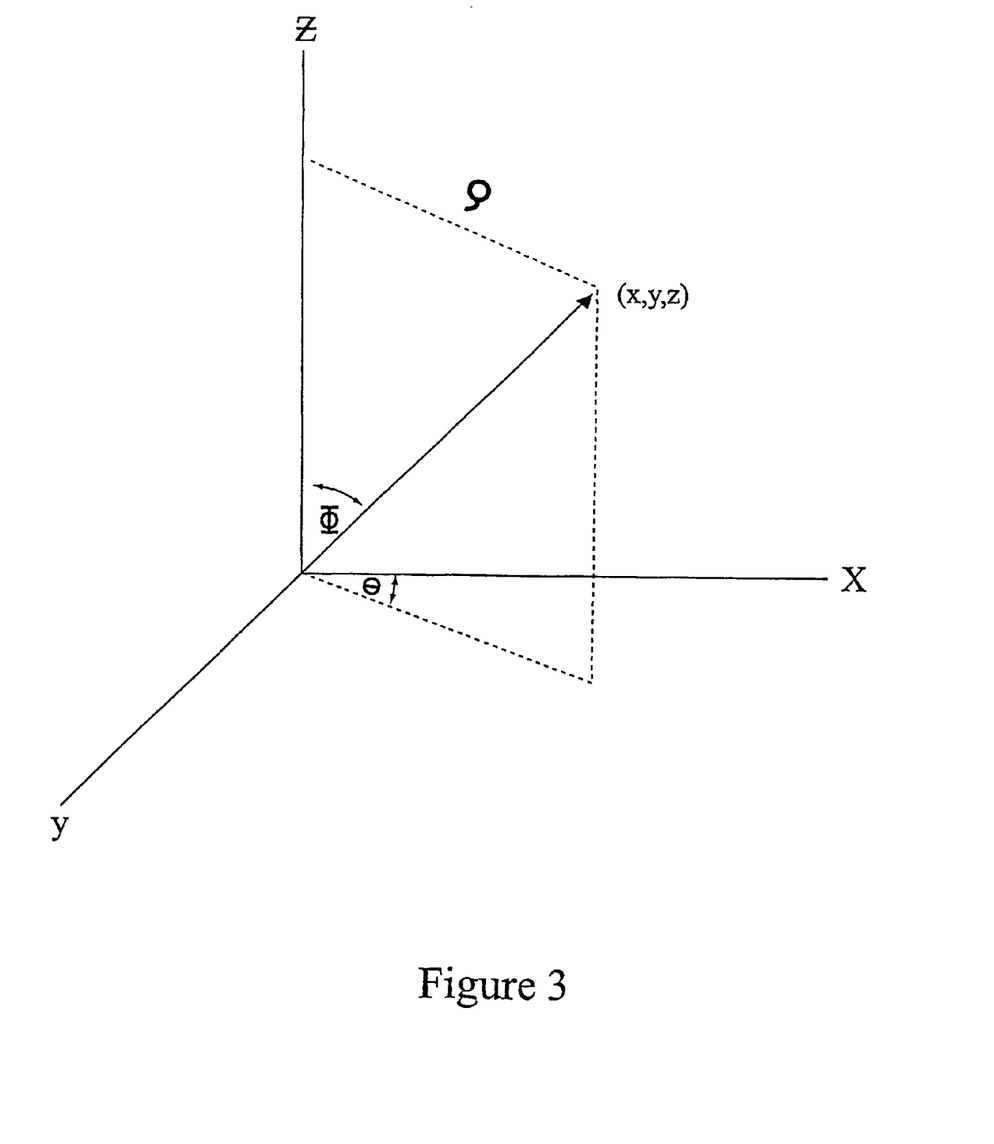
FIG. 3: A diagram indicating how the Cartesian coordinates of a point correspond to its spherical coordinates.

The spherical coordinates, $\rho$, $\theta$, $\phi$, expressed in Cartesian coordinates, x, y, z, of a point in space, are as follows (see FIG. 3):

$$\rho = \sqrt{x^2 + y^2}$$
$$\theta = \tan^{-1}\left(\frac{y}{x}\right)$$
$$\phi = \tan^{-1}\left(\frac{\rho}{z}\right)$$

$\theta$ is the azimuthal angle, and $\phi$, the zenith angle. The effect of the fisheye lens is such that each point Is projected onto a hemisphere of diameter D, centred at the origin, with the projective axis being the z-axis. The point on the hemi-sphere when subsequently projected onto the x-y plane, corresponds to the source image coordinate (u, v) as captured by the image recording device. As a result, the value of the pixel at location (u, v) of the source image is assigned as the value of the pixel on the environmental map that corresponds to the (x, y, z) coordinate on the cube.

Given the above, for any point on the hemi-cube, the coordinate (u, v) in the source image (the environmental map) can be evaluated from $\theta$ and $\phi$, corresponding to the planar coordinates of the point of intersection of a ray extending from the origin to the hemi-cube with the hemi-sphere, as follows.

$$u = \frac{\phi D}{\pi}\cos(\theta)$$
$$v = \frac{\phi D}{\pi}\sin(\theta)$$

Since the lens is ideal, the radial distance from the origin of any point (u, v) on the x-y plane should be linear in the zenith angle $\phi$. (Take the square root of the squares of u and v, which results in a linear function of $\phi$.)

Given a digitized hemispheric fisheye source image formed as described above, the starting point is to determine the centre of projection ($u_c$, $v_c$) on the source image array, and the length in image pixel, D, equal to a view of 180 degrees in zenith angle. In practice, the centre of projection, (i.e. the point where $\phi=0°$) is not always the centre of the source image array. One would then determine the image array corresponding to each of the sides by determining for each point in the corresponding image array the (x, y, z) coordinate, compute the corresponding (u, v) coordinate on the source image, and estimate the value of the pixel at (u, v) using some sort of interpolation scheme based on the neighboring pixel values. In the expression for (u, v), the coordinate must be translated by the centre of projection ($u_c$, $v_c$) in the source image.

At this point the images require colour balancing in order to remove visible discrepancies in colour between any two complementary half-images along the separating edge.

With the geometry aligned and colour balanced, the visible interface between the hemi-cubes disappears, resulting in a complete cube texture map comprising the six full-sides. The stacked face arrangement and ordering is preferably chosen to comply with a VRML cube primitive, for possible display on the world wide web.

Standard computer graphic techniques may be used to render the six-sided cube centred at the origin. The viewpoint is fixed at the origin, and the view direction along the positive z axis. Using a pointing device such as a mouse, a viewer can vary the yaw and pitch of the view by rotating the cube around the Y—followed by a rotation about the X-axis. The faces are mapped to the cube using perspective texture mapping, and as the user switches scenes, the texture map changes.

Preferred embodiments of this invention use one or more electronic processors with graphics display devices and other human interface devices. The processors may be a native device or resident on an electronic network such as a local area network, an intranet, an extranet, or the Internet. The source images may be derived from a digital camera, such as those using CCD cells, or from digitized images of photographs taken with a conventional camera outfitted with a fisheye lens, amongst others.

Geometric Alignment

Spatial, or geometric, alignment of the two hemispheric images proceeds on the basis that there is an overlapping annular region between the two images. Given a lens with a half field of view of v=105 degrees, the annulus of overlap would be 30 degrees (two times 15 degrees on each side) if the hemispheric images were taken exactly 180 degrees apart. In this case, each annular region beyond the ring denoting 180 degrees would be a mirror image of the annular region of the same dimension in the other hemispheric image (reflected across the 180° ring). Thus in FIG. 1 the region consisting of the two outermost concentric annuli in each of the mapping of the two fisheye lens is a mirror image of the another.

In practice, the camera may experience displacement from the ideal position for taking the reverse image after recording the initial one: rotation about each of the 3 Cartesian axes and translational movement in the x-y plane may occur. The model of distortion assumed by this invention however postulates 2 types of distortion: a translation in the x-y plane and a rotation about the projection z-axis. The image recorders are assumed to be directed precisely 180 degrees apart with coincidental projection axes, the z-axis. The source image planes are assumed to be coplanar, but the image as recorded experiences a possible translational and rotational displacement.

The approach disclosed by this invention is to align 3 points in the overlapping region of one hemispherical image with the same 3 points in the other image using the above mentioned model of distortion. This method aligns the three pairs of points such that the zenith angle $\phi$ from the centre of projection is the same for any two pairs of points. Once aligned, the centre of projection and the distance in pixel for 180 degrees field of view may be computed. Knowledge of these two allows the cubic faces of the environmental map to be generated.

The following defines the notation adopted:

3 non-collinear points $p_1(x_1, y_1)$, $p_3(x_3, y_3)$, and $p_5(x_5, y_5)$ in the overlapping annular region of a hemispheric source image $T_1$ with the centre of projection at $q_1$ and the complement set of points $p_2(x_2, y_2)$, $p_4(x_4, y_4)$, and $p_6(x_6, y_6)$ with its centre of projection at $q_2$ for the reverse image $T_2$ (Since T2 is the reverse image, it becomes necessary to reflect $T_2$ about the vertical axis defined by the azimuthal angle $\phi$ being 90 or 180 degrees, to yield $T_2'$. For the purpose of simplicity though, refer henceforth to $T_2'$ as $T_2$;

the angle that each source image is rotated about its axis of projection relative to the earth's horizon: $a_1$ and $a_2$, for $T_1$ and $T_2$ respectively. For the purpose of simplicity, assume that $a_2$ is zero, that is to say, the second image is not rotated relative to the horizon;

the true center of projection: Q;

the diameter in pixels equivalent to 180 degrees field of view: D.

Given that the images $T_1$ and $T_2$ are precisely 180 degrees apart, any point $p_1$ will form the same azimuthal angle $\theta$ relative to $q_1$, the centre of projection in its own image, as its complement $p_2$ would with $q_2$. Therefore, if the two centres of projection were the same point Q, then the z component of the vector cross product of $(p_1-Q)$ and $(p_2-Q)$ would equal zero since these two vectors are parallel.

The centre Q may be found assuming that displacement consists solely of a translation $\Delta x$ and $\Delta y$, and a rotation of angle $\alpha$. One embodiment of this approach assumes that $q_2$ is fixed as the centre Q, and determines the displacement ($\Delta x$, $\Delta y$, $\alpha$) of $q_1$, resulting in $q_1'$, such that the z components of the 3 vector cross products of $(q_1'-p_1)$ and $(q_2-p_2)$, $(q_1'-p_3)$ and $(q_2-p_4)$, and $(q_1'-p_5)$ and $(q_2-p_6)$ are all zero. (The cross products are all zero vectors since the initial vectors have zero z component resulting in no planar components to the resultant cross products.)

This essentially sets up a system of 3 equations (the z components of the cross products) in 3 unknowns ($\Delta x$, $\Delta y$, $\alpha$), which a person skilled in the art is able to solve. For example, the Newton-Raphson iterative method for finding roots of systems may be used. An initial approximation to the solution for ($\Delta x$, $\Delta y$, $\alpha$) may be the translational difference between $p_1$ and $p_2$, and the angle zero.

The result of this computation is the 3-tuple, ($\Delta x$, $\Delta y$, $\alpha$). If $p_i'$ is the result of translating and rotating $p_i$, each complementary pair of vectors $(q_2-p_i')$ and $(q_2-p_j)$, where i=1, 3, and 5, and j=2, 4, and 6 respectively, are parallel, thus the lines joining each complement pair of $p_i'$ and $p_j$ must intersect at the same point $q_2$ (same position as Q and $q_1'$). As a result, the centres of projection in each hemispheric image (referred to as ($u_c$, $v_c$) for each hemispheric image earlier), $q_1$ and $q_2$, may be established.

Furthermore, it is now possible to determine D, the number of pixels equal to 180 degrees field of view, which is used for evaluating the value of coordinates (u, v) in the environmental map. Since the sum of the zenith angle $\phi$ of a point in one image added to the zenith angle of the same point in the other hemispheric image is 180 degrees, the zenith angle 180 corresponds to the average of the radial distance for any two complement points. Therefore this allows D to be computed.

Given the centre of projection, ($u_c$, $v_c$), for each hemispheric image, and the distance in pixel D for 180 degrees, the 6 perspective sides of the cubic environmental map may now be generated.

In one preferred embodiment of this invention, the user selects for display annular regions from both hemispheric images. Each annulus covers typically the overlapping region between the two source images, subtended by the zenith angles between 270−v and 90+v, where v is the half-field of view. For example, if v is 105 degrees (i.e. the full field of view is 210 degrees), the annulus region corresponds to the field of view between 165 and 195 degrees. Once the two annuli of interest are displayed, typically at the same time, the user may then select a common point in each annulus. This invention also includes the variation where the user merely has to denote the approximate area where the second of the pair of points is located in the second image. The electronic processor would utilize imaging processing techniques such as a convolution mask to locate the precise point in the second image corresponding to the first point in the first image.

This invention further includes variations where automatic determination of the 3 common points are performed without human intervention.

Although it is theoretically possible to select all three points in the same nearby neighbourhood, the preferred approach is to select points which are widely spread apart, typically in different thirds of the annular region. Therefore, display of only a common sector of the annul typically occurs for the point selection process. Displaying smaller areas permits greater spatial resolution and more precise location within the areas.

Once the common points are identified, the electronic processor carries out computation of the centre of projection ($u_c$, $v_c$) for each hemispheric image and the distance D in pixel for 180 degrees field of view. The environmental map of the cubic sides are then ready to be fully generated given these parameters and the rotation $\alpha$.

Colour Balancing

In addition to removing spatial distortions as mentioned above, two complementary half-images as combined typically require colour balancing due to different prevailing lighting conditions or imaging recorder characteristics. This invention further discloses methods and apparatus for colour balancing across a discontinuity (or edge) in an image that does not remove detail from the image as a whole.

Figure 4:
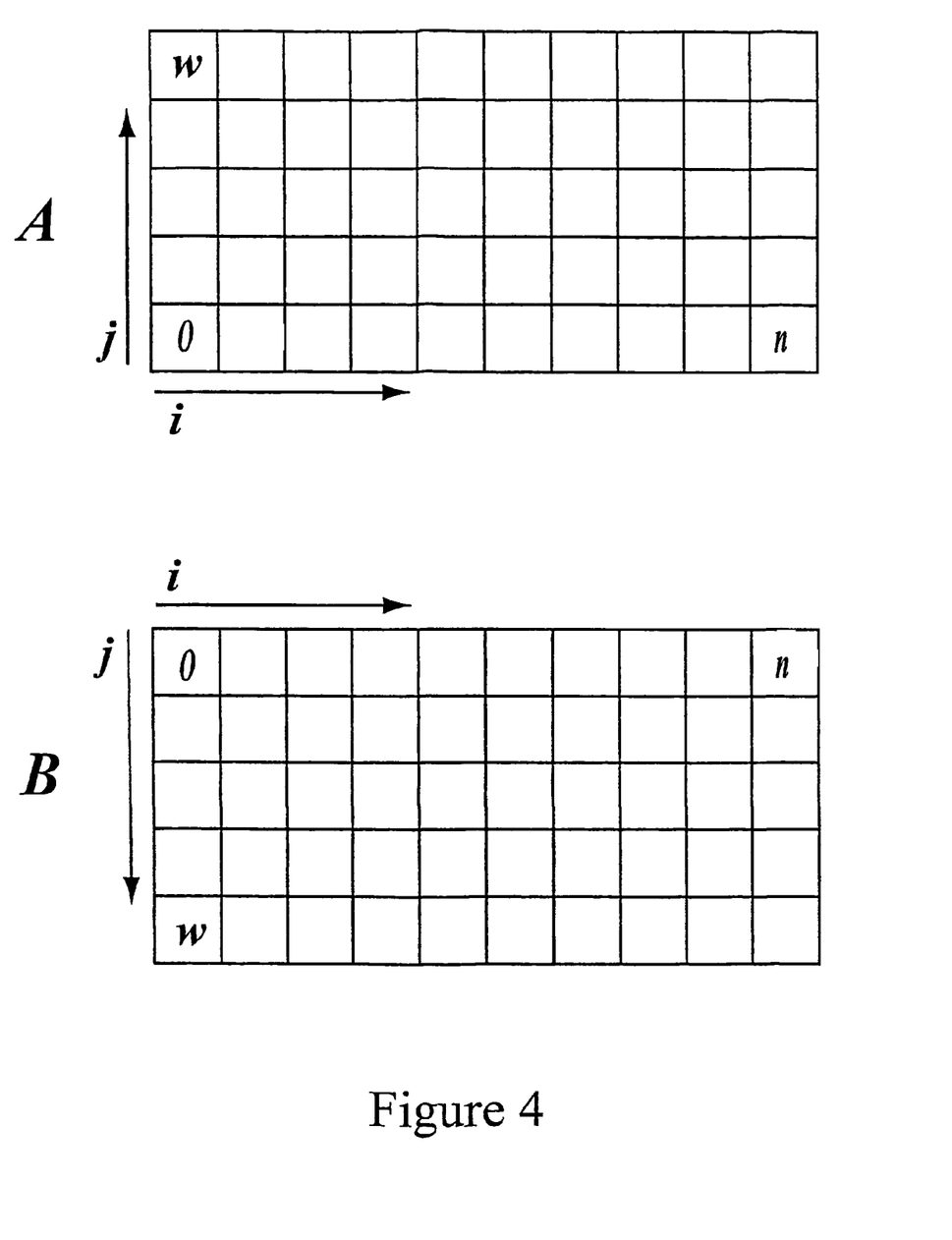
FIG. 4: A diagram of the two sides of an edge (discontinuity in colour regimen) as represented by two 2-dimensional arrays.

To illustrate the method by example, let one side of the edge be represented by a 2 dimensional array $A_{j,i}$, and the other side $B_{j,i}$, both of dimensions m+1 rows (indexed 0 to m) and n+1 columns (indexed 0 to n). The 0-th row of both arrays lie adjacent to the edge as shown in FIG. 4, with rows further away from the edge in increasing index of row. Although only one value for each pixel is indicated here, this method will work for any color model including RGB, CMY, YIQ, HSV, and HLS. These colour models are well known in the field of computer graphics. For example, in the case of an RGB colour model, there would be 3 arrays, $_1A_{j,i}$, $_2A_{j,i}$, and $_3A_{j,i}$, corresponding to each of the red, green, and blue colour values; the same would apply for the B arrays.

This invention makes use of the concept of "imbalance waves" of varying frequency which runs additively parallel and adjacent to the edge for a certain depth normal to the edge. An iterative approach is adopted whereby a different filter is applied at each step to the edge region. The analogy is that each filter is a low pass filter, tuned to a distinct "frequency" level, which eliminates imbalance waves of frequency at that level and greater. During each iteration, a filter of a lesser frequency is used until a frequency of 1 is reached.

Generally, at each iteration, a filter of level $w=2^h$ is applied, where h decreases from m to 0. The value w is a measure of the width of a strip on the edge, the average difference, in colour value across the edge on the strip, is permitted to influence colour values during the steps constituting the particular iteration. The value m is chosen such that $2^{m+1}$ is less than the width of a full side of the cube, which will become clear later in this discussion. Instead of powers of two, which has the advantage of being intuitive and can enable m to decrease to the value 0 quickly as the logarithm of w, other schemes for decreasing w will also suffice.

During an iteration, the difference at column i across the edge between any two adjacent $A_{0,i}$ and $B_{0,i}$ is evaluated as $\Delta_i$.

$$\Delta_i = A_{0,i} - B_{0,i} \quad i = 0, 1, \ldots, n$$

In cases where there is high contrast in difference across an edge, a slightly different method for computing $\Delta_i$ is helpful to avoid "bleeding" of the high intensity value of the one side into the lower intensity opposite side in the balanced image. This approach assumes the images as slightly overlapping in the rows and slightly offset in columns (which is typically the case in reality), and uses both images. If it is assumed that there are x overlapping rows, one way of computing the value of $\Delta_i$ is to use a small region across the boundary in one image and centred on $A_{0,u}$ (or $B_{0,i}$, no difference whichever is used) as a square mask (typically 3 elements by 3 elements). The region is overlaid on a series of corresponding areas in the other image, the other areas within a typically square domain centred on the $'A_{0,i}$ in the other image, where $'A_{0,i}$ is the corresponding pixel for $A_{0,i}$ in the original image. Each side of the domain has size typically twice the overlapping width (plus one). The sums of the squares of the differences between the values of the mask and the underlying pixels are calculated as the mask is translated across the surface of the domain. One embodiment calculates $\Delta_i$ as the average of the arithmetic difference of the mask the underlying pixels of the image centred at the place of the minimal sum of squares.

If the overlap is greater than two, then the mask may be chosen be larger than 3×3, up to the point where it may be limited in translational freedom of only one pixel in any of the 8 directions.

An average of the differences, $\Gamma_i$, for any column i on the edge is taken for $2w+1$ differences centred on i, with wraparound values for any difference with index exceeding the bounds of the difference array.

$$\Gamma_i = \frac{\sum_{k=i-w}^{i+w} \Delta_k}{2w+1}$$

where $k=k+(n-1)$, if $k<0$, and $k=k-(n-1)$, if $k>n$, for the purpose of the summation. Clearly, this is just one way of calculating the average of the difference, and the invention is not restricted to this one way, although this results in computational efficiency. Other variations could weight the differences by a window appropriate to the type of image, e.g. a Gaussian window centred on i. Alternatively, there may be a threshold for discounting those differences which exceed the threshold. For example, the presence of a colour burst may be one instance where a precipitous drop in value across an edge should be discounted. Visually, such a measure would have little impact on the resultant reconstructed image.

At this point, the value of the side with the lower value is adjusted upwards by a variation term which is a function of the average difference across the edge. The adjustment used decreases with distance from the edge. A preferred embodiment then redefines all the elements of the arrays, $A_{j,i}$ and $B_{j,i}$, as follows:

$$A_{j,i} = A_{j,i} - \frac{1}{2}\Gamma_i \frac{w-j}{w}$$

$$B_{j,i} = B_{j,i} + \frac{1}{2}\Gamma_i \frac{w-j}{w}$$

Although the above weights the average difference decreasingly with distance on a linear basis from the edge (w-j), this invention is not limited to this weighting scheme. One variation is where a faster drop-off, e.g. an inverse exponential, is required by the character of the image.

The way that $\Delta_i$ is calculated influences the effect of a high contrast edge. Without seeking out the minimum sum of square of difference, a high contrast edge will change the value of both sides of the edge more significantly than if the difference where the minimum sum of square occurred was used.

Typically, the iteration ends when w reaches the value of one (filter of frequency 1). However, it is possible to impose a threshold beyond which no further iterations are carried out. One approach is based on the average difference across the edge. Once the average difference drops below a threshold, the iterative steps end. In this case the threshold may be taken relative to a measure of the noise in the neighbourhood of the edge.

Preferred embodiments of this invention also involve computer program products which are recorded on a machine-readable media. Such computer program products when loaded into an apparatus that can read and execute the instructions borne by the program products in order to carry out the functions of geometric alignment or colour balancing denoted above.

The system, methods, and products above may operate modularly or in serial. For example, the same system may perform both alignment and colour balancing, or two separate systems operate serially on the digitized images. These may be used in standalone configurations or in a networked environment cooperating with many other applications, systems, databases etc. for capturing and processing. Environmental maps may be generated from colour balanced images.

It will be appreciated that the description above relates to the preferred embodiments by way of example only. Many variations on the device, method, and computer program product for delivering the invention will be understood to those knowledgeable in the field, and such variations are within the scope of the invention as described, whether or not expressly described.

The embodiments of the invention in which an exclusive property or privilege is claimed are defined as follows:

1. A computer-assisted method for aligning two digitized overlapping hemispheric images of an environment obtained with a fisheye lens comprising the steps of:
   (a) receiving the location of three spatial points as recorded in an overlapping region of each hemispheric image;
   (b) determining the translation and rotation of one hemispheric image relative to its ideal position from the locations of the three spatial points in the two images based on a displacement model; and
   (c) obtaining the true centre of projection (Q) in each image.

2. A system for aligning two digitized overlapping hemispheric images of an environment obtained with a fisheye lens comprising:

(a) a unit for receiving the location of three spatial points as recorded in an overlapping region of each hemispheric image;
(b) a unit for determining the translation and rotation of one hemispheric image relative to its ideal position from the locations of the three spatial points in the two images based on a displacement model; and
(c) a unit for obtaining the true centre of projection (Q) in each image.

3. A method for balancing the color difference of two pixelated images joined together at an edge, comprising iteratively increasing (or decreasing) the values of pixels near the edge, each time taking into consideration the average difference of pixel colour across a smaller strip of the edge near the pixel.

4. The method of claim 1 where the spatial points comprise pairs of complementary points, with each complementary point of the pair correlating to a different hemispheric image, and where the one hemispheric image has a centre of projection (q).

5. The method of claim 4 where each complementary point of the pair corresponds to the same common point on each hemispheric image.

6. The method of claim 4 where the displacement model comprises aligning the complementary points by making the zenith angle $\phi$ for the complementary points of each pair equal.

7. The method of claim 4 where aligning comprises:
forming complementary vectors between each complementary point from both hemispheric images and the centre of projection (q); and
displacing the one hemispheric image from the other hemispheric image, through rotations and translations of the vectors, so that the complementary vectors are parallel and pass through the centre of projection (q).

8. The method of claim 7 where displacing comprises making the vector cross product of the vectors zero.

9. The method of claim 7 further comprising determining the number of pixels equal to 180 degrees of view.

10. The method of claim 9 where determining the number of pixels equal to 180 degrees of view comprises computing, for each pair of complementary points, the average of a radial distance between the centre of projection (q) and each point, after the one hemispheric image has been displaced.

11. The method of claim 9 further comprising generating six perspective sides of a cubic environmental map using the true centre of projection (Q) of each hemispherical image and the number of pixels equal to 180 degrees of view.

12. The method of claim 1 where the three spatial points are non-collinear.

13. The method of claim 5 where receiving the location of the common points comprises manually selecting the complementary points by selecting corresponding features in each hemispherical image.

14. The method of claim 5 where receiving the location of the common points comprises automatically selecting the complementary points by selecting corresponding features in each hemispherical image.

15. The method of claim 5 where the overlapping region is an annulus, and receiving the location comprises selecting the common points are from different thirds of the annulus.

16. The method of claim 5 where receiving the location comprises a user selecting a spatial point in the one hemispheric image and an approximate area in the other hemispheric image so that an electronic processor locates the precise spatial point in the second image.

17. The system of claim 2 where the spatial points comprise pairs of complementary points, with each complementary point of the pair correlating to a hemispheric image, and where the one hemispheric image has a centre of projection (q).

18. The system of claim 17 where each complementary point of the pair corresponds to the same common point on each hemispheric image.

19. The system of claim 17 where the displacement model comprises aligning the complementary points by making the zenith angle $\phi$ for the complementary points of each pair equal.

20. The system of claim 17 where aligning comprises:
forming vectors between each complementary point from both hemispheric images and the centre of projection (q); and
displacing the one hemispheric image from the other hemispheric image, through rotations and translations of the vectors, so that the complementary vectors are parallel and pass through the centre of projection (q).

21. The system of claim 20 where displacing comprises making the vector cross product of the vectors zero.

22. The system of claim 20 further comprising a unit for determining the number of pixels equal to 180 degrees of view.

23. The system of claim 22 where determining the number of pixels equal to 180 degrees of view comprises finding the average of the radial distance for any pair of complementary points, after the one hemispheric image has been displaced.

24. The system of claim 22 further comprising a unit for generating six perspective sides of a cubic environmental map using the true centre of projection (Q) of each hemispherical image and the number of pixels equal to 180 degrees of view.

25. The system of claim 2 where the three spatial points are non-collinear.

26. The system of claim 18 where the unit for receiving the location of the common points comprises a user interface for manually selecting the complementary points by selecting corresponding features in each hemispherical image.

27. The system of claim 18 where the unit for receiving the location of the common points comprises an electronic processor for automatically selecting the complementary points by selecting corresponding features in each hemispherical image.

28. The system of claim 18 where the overlapping region is an annulus, and the unit for receiving the location comprises a interface for selecting the common points are from different thirds of the annulus.

29. The system of claim 18 where the unit for receiving the location comprises a user interface for selecting a spatial point in the one hemispheric image and an approximate area in the other hemispheric image so that an electronic processor locates the precise spatial point in the second image.

30. The method of claim 3, wherein the values are colour values.

31. The method of claim 3, wherein the values are increased or decreased by a variation term, which is a function of the average difference across the edge.

32. The method of claim 3, wherein the strip comprises pixels from each of the two images.

33. The method of claim 3, wherein the pixels near the edge comprise a column of pixels perpendicular to the edge at an index, i, defined by a pair of adjacent pixels across the edge.

34. The method of claim 33, wherein the strip comprises pixels from each of the two images and wherein the difference is calculated between pixels from each image that are adjacent to one another across the edge.

35. The method of claim 34, wherein the strip is centered at the index, i.

36. The method of claim 33, wherein the value of each pixel in the column is increased or decreased by a variation term, which is weighted decreasingly with the distance of each pixel from the edge.

37. The method of claim 33, wherein the strip has a width along the edge equal to about double a length, w, of the column.

38. The method of claim 37, wherein, upon each iteration, the length, w, decreases.

39. The method of claim 33, wherein the method is repeated for a plurality of the index, i, along the edge.

40. The method of claim 39, wherein the plurality comprises each pair of adjacent pixels along the edge.

* * * * *